Dec. 30, 1947.  C. R. GOTTSCHALL  2,433,448
CONTACT HOOK FOR AIR PICK-UP SYSTEMS AND THE LIKE
Filed March 17, 1945  3 Sheets-Sheet 1
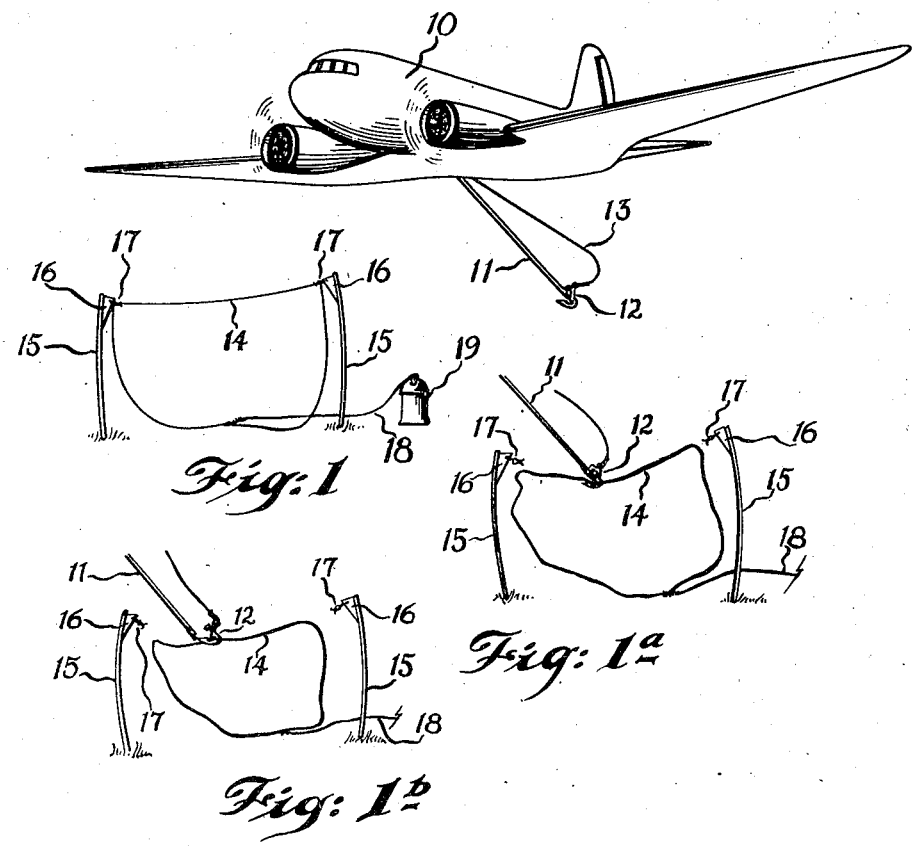
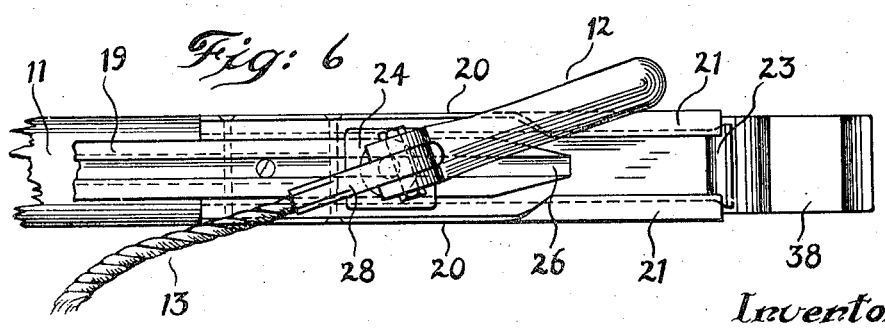
Witness:
Sarah Strut
Inventor
Clarence R. Gottschall
by: Hyde W. Ballard
Attorney Dec. 30, 1947.  C. R. GOTTSCHALL  2,433,448
CONTACT HOOK FOR AIR PICK-UP SYSTEMS AND THE LIKE
Filed March 17, 1945  3 Sheets-Sheet 2
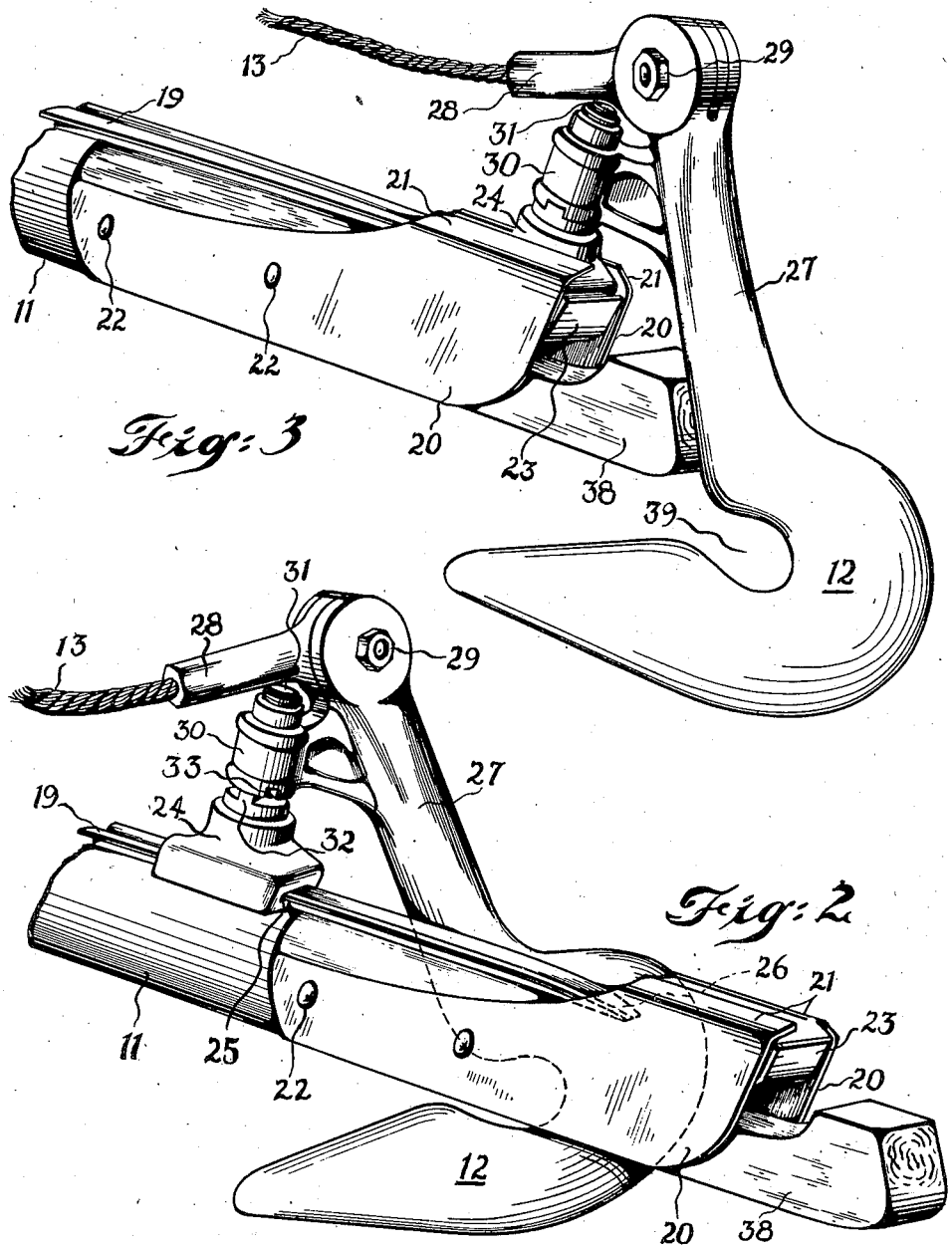
Inventor
Clarence R. Gottschall
by: Hyde W. Ballard
Attorney
Witness:
Sarah Street

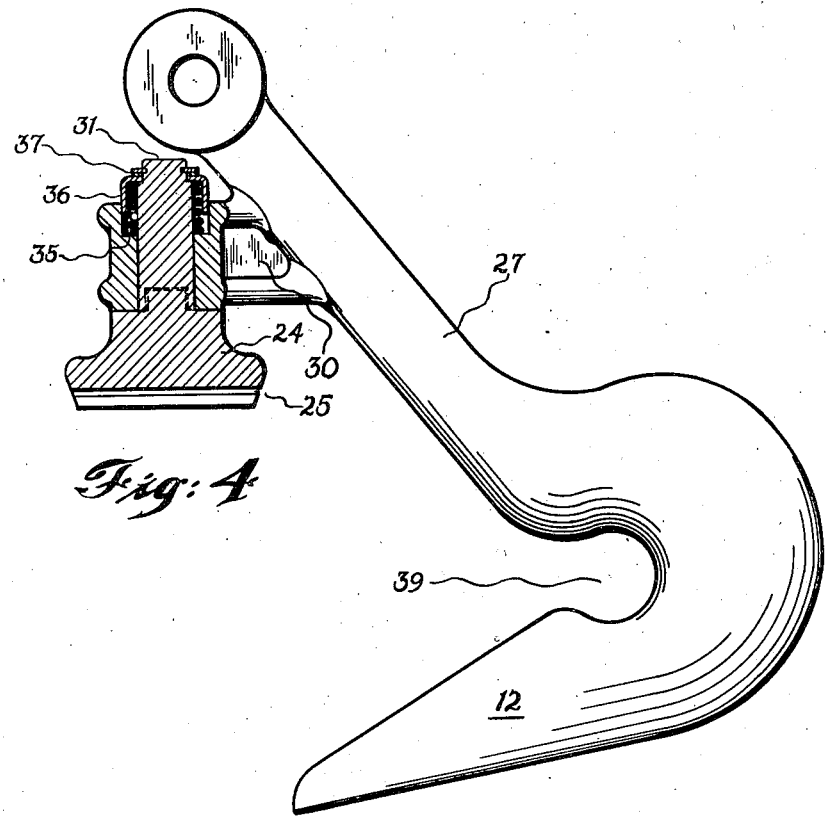
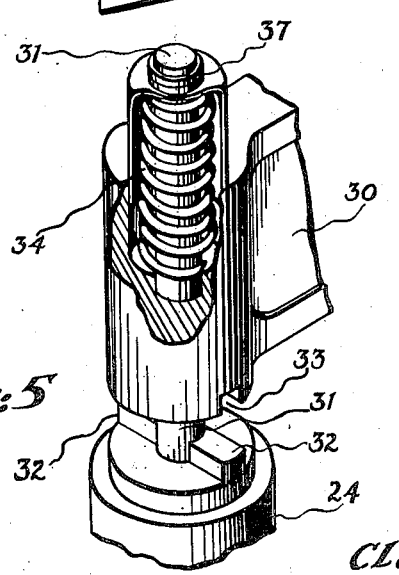

Patented Dec. 30, 1947

2,433,448

UNITED STATES PATENT OFFICE 2,433,448

CONTACT HOOK FOR AIR PICKUP SYSTEMS AND THE LIKE

Clarence R. Gottschall, Wilmington, Del., assignor to All American Aviation, Inc., Wilmington, Del., a corporation of Delaware Application March 17, 1945, Serial No. 583,348

9 Claims. (Cl. 258—1.2)

My invention relates to air pick-up systems and more particularly contact apparatus for placing and positioning a pick-up hook on a contact arm.

Heretofore, the type of hook generally employed in the pick-up art for installations where the hook must be positioned near the end of a depending pick-up or contact arm, had an off-set shank of the type generally disclosed in S. C. Plummer application, Serial No. 483,843, filed April 21, 1943, now Patent No. 2,402,574, and A. B. Schultz et al. application, Serial No. 483,238, filed April 16, 1943, now Patent No. 2,402,919.

It has been found desirable to locate the track or guiding means for sliding the hook down the arm on the rearward portion of the arm in order to protect the track from mud and ice when the airplane is taxiing, and also to avoid cutting the loop which contacts and slides down the front portion of the arm. It, therefore, becomes necessary to construct the hook in such a manner that it is supported from the track on the back of the arm and at the same time to dispose the bill of the hook forwardly in a position to intercept the loop as it slides down the arm.

The offset shank type of hook, referred to above, has been found to be satisfactory for use in picking up lighter loads, such as mail containers and light aircraft. It has been found, however, that in pick-up operations requiring a much heavier tow line and hook, such as are used for picking up 15 to 20 place gliders, the torsional movement caused by the weight of the shank tends to prematurely release the hook from the hook retainer, particularly in rough air and also when the loop strikes well up on the arm. To avoid this disadvantage, I have designed a hook which can be positioned at the tip of the arm along the center line of the arm thereby eliminating any tendency to twist after the hook is in position.

A primary object, therefore, of my invention is to provide a slidable hook and fitting therefor which will permit the hook to be lowered while being supported from the trailing edge of the pick-up arm and which will automatically become self-aligning when the shank of the hook reaches the end of the arm.

A further object is to provide a self-locking hook releasably positioned and trailing directly behind the end of a contact arm.

A further object of my invention is to provide a swiveling lock for a pick-up hook.

A further object is to provide a contact hook having a shank in tension during the towing operation in order to reduce the size and weight of the hook.

A still further object of my invention is to provide guiding means on a pick-up arm facilitating engagement with a loop.

Other objects and advantages of the invention will be apparent during the course of the following description.

Like reference numerals denote like parts in the several figures of the drawings.

Fig. 1 is a diagrammatic view of an ariplane about to make contact with a pick-up loop and ground station.

Fig. 1a shows the loop being pulled out of the releasable clips on the ground station.

Fig. 1b shows the hook being detached from the end of the contact arm.

Fig. 2 is a detailed perspective view of a pick-up hook constructed according to my invention as it slides down the track of a contact arm.

Fig. 3 shows the structure of Fig. 2 with the hook in pick-up position.

Fig. 4 is a detailed partly sectioned view of the hook and swiveling attachment.

Fig. 5 is a detailed view part'y broken away of the swiveling attachment shown in Fig. 4.

Fig. 6 is a top view of the hook and hook retainer shown in Fig. 2 but with the hook nearer the end of the arm.

While certain novel features of the invention are disclosed herein with considerable detail with respect to certain particular forms of the invention, it is not desired to be limited to such details since many changes and modifications may well be made without departure from the spirit of the invention in its broadest aspect.

Referring now more particularly to the drawings, aircraft 10 carries a depending pick-up arm 11 on which is mounted a pick-up hook 12. Hook 12 is connected to structure in the aricraft which may be a winch (not shown) by line 13. As the aircraft 10 continues in its flight, arm 11 contacts loop 14 which is releasably supported by poles 15, flags 16 and releasing clips 17. Loop 14 may be attached to any object which is desired to be towed by means of leader 18. The towed object may be another aircraft, a glider or a cargo container such as that shown at 19. When arm 11 contacts loop 14, the latter is immediately withdrawn from clips 17 and the loop in turn withdraws or detaches hook 12 from its support on arm 11. These successive steps are illustrated in Figs. 1a and 1b.

For further details of the operation of a pick-up system, reference is made to S. C. Plummer application, Serial No. 423,999, filed December 22, 1941, now Patent No. 2,373,414, R. C. du Pont application, Serial No. 478,517, filed March 9, 1943, now Patent No. 2,418,702, and patent to S. C. Plummer, No. 2,367,607, which are hereby incorporated insofar as may be necessary to complete the disclosure.

Referring now to Figs. 2 and 3, arm 11 may carry a track or slide 19 designed to conduct the hook from an accessible point in the aircraft to its operative pick-up position at the end of the arm. A hook retaining and releasing device is installed near the tip of the arm. This device forms no part of the present invention, it being fully disclosed in the A. B. Schultz et al. application, Serial No. 483,238 cited above.

In general, the hook retainer is comprised of resilient spring side plates 20 having lips 21 and attached to the arm by bolts or rivets 22. A spring detent and bottom wall 23 form a yieldable sheath or pocket adapted to receive slider 24 and to release the slider when the loop 14 engages the hook 12. Slider 24 has cooperating grooves 25 which enable it to slide freely on track 19 but which prevent disengagement from the track until the slider has traveled past the lower terminus 26 of the track.

Hook 12 has a shank 27 to which pick-up line 13 is pivotally attached by means of eye 28 and nut and bolt 29. Line 13, if desired, may be swedged to fitting 28. Also attached to shank 27 is a trunnion 30 which swivels upon pin 31 which is in turn attached to slider 24. Slider 24 carries a pair of teeth or dogs 32 adapted to cooperate with slots 33 in trunnion 30. The relative position of slots 33 and dogs 32 is such that when the dog fits in the slot the hook 12 and shank 27 will be in line with the extended center line of the arm. Spring 34 permits the slider and dogs to be released from recess 33 and then turned to any desired position. Spring 34 acts against shoulder 35 in trunnion 30 and sleeve 36 which is secured to pin 31 by suitable locking devices 37.

In order to effect the greatest strength with least weight in the hook, it is desirable to have the point of loop attachment in line with the point of tow line attachment. Shank 27 is, therefore, preferably straight in order to eliminate as much as possible any stress other than tension. Therefore, the angle at which trunnion 30 is attached to shank 27 must be such that the shank will have sufficient clearance when sliding down the arm to prevent any binding. In view of this circumstance, it has been found desirable in some installations to extend arm 11 at 38 in such a manner that the loop, as it slides down the arm, will be more positively guided into the recess 39 of the hook. Thus any likelihood that the loop when sliding off the arm would strike shank 27 instead of becoming lodged in recess 39 is avoided.

To prepare the hook for a pick-up, the operator pulls slider 24 to compress spring 34 until dogs 32 have become sufficiently disengaged from slots 33 to permit slider 24 to be given approximately one-quarter turn. The slider is then engaged with track 19 at a convenient location in the aircraft. Cable 13 is then payed out to permit the hook and slider to slide down the track into the hook retainer. The weight of the hook will cause it to turn on pin 31 so that the shank of the hook will slidably contact the side of the arm as the hook is run down. As soon as shank 27 passes beyond the extension 38 of the arm, gravity, assisted by air drag, will cause the hook and trunnion 30 to further pivot on pin 31 until slots 33 come in alignment with dogs 32 at which moment spring 34 will snap trunnion 30 into locked engagement with slider 24. The hook is now locked securely in the desired postion with respect to the arm and in such a way that there is no torque on any part of the arm caused by uneven weight distribution in the hook and slider assembly.

It will be apparent that the slots 33 may be located on slider 24 and the dogs 32 located in trunnion 30 if desired. Also, it will be obvious to one skilled in the art that the slots and dogs can be replaced by other well known devices for accomplishing the same purpose. For example, a spring loaded pin and cooperating hole could likewise be utilized.

I have thus described a pick-up hook which is inexpensive to manufacture and which is more reliable than types of similar hooks previously employed.

Having thus described my invention, I claim:

1. In contact apparatus for air pick-up systems, a contact arm, guide means on said arm, a pick-up hook having a bill and an elongated straight shank, a pivot on said shank and extending in a direction toward said bill, and means attached to said shank through the pivot for slidably cooperating with said guide means.

2. In contact apparatus for air pick-up systems, a contact arm, guide means on said arm, a pick-up hook having an elongated shank the major part of which is above the top of said arm and a bill below the bottom of said arm, a pivot on said shank extending substantially toward said bill, means attached to said shank through the pivot for slidably cooperating with said guide means, and means for releasably retaining and positioning said hook at the end of the arm.

3. In contact apparatus for air pick-up systems, a contact arm, guide means on said arm, a pick-up hook having an elongated shank, a trunnion on said shank, a slider on said guide means and having a pivot adapted to turn in the trunnion, means for locking said slider with respect to said trunnion, and a spring operative between said slider and trunnion whereby the locking means may be released.

4. In contact apparatus for air pick-up systems, a contact arm, guide means on said arm, a pick-up hook having an elongated straight shank, a pivot on said shank in diverging relation to said shank, means attached to said shank through the pivot for slidably cooperating with said guide means, and a guard on said arm for the shank of the hook.

5. In contact apparatus for connecting a moving object with a relatively stationary object, a contact arm having sides, guide means on said contact arm, a hook slidably attached to the guide means, a shank on said hook positioned laterally of said arm and in engagement with one of said sides when the hook slides on the guide means, and a swivel on the shank for swiveling the shank from a lateral position to an aligned position at the end of the arm.

6. In contact apparatus for air pick-up systems, a contact arm having sides, a rear face, and a front face adapted to be engaged by a pick-up loop, a guide on said rear face, a slide operatively assembled on said guide, and a pick-up hook having a pivoted shank extending laterally of the arm and in engagement with one of said sides when said slide operates on the guide.

7. In contact apparatus for air pick-up systems, a contact arm, a guide on said arm, a slide operatively assembled on said guide, a pick-up hook having a shank, an element of a pivotal connection on said slide, a complemental element of said pivotal connection on said shank, and releasable locking means associated with said elements for locking said hook in a desired relation with respect to said slide.

8. In contact apparatus for air pick-up systems, a contact arm, a guide on said arm, a slide operatively assembled on said guide, a pick-up hook having a shank, an element of a pivotal connection on said slide, a complemental element of said pivotal connection on said shank, one of said elements being formed with a recess, a dog on the other of said elements and adapted to be received in said recess, and yieldable means for maintaining said dog in said recess.

9. In contact apparatus for air pick-up systems, a contact arm, a guide on said arm, a slide operatively assembled on said guide, a pick-up hook having a shank, an element of a pivotal connection on said slide, a complemental element of said pivotal connection on said shank, releasable locking means associated with said pivotal elements for locking said slide and shank in a desired relation, and yieldable means for maintaining the locked relation.

CLARENCE R. GOTTSCHALL.

REFERENCES CITED

The following references are of record in the file of this patent:

UNITED STATES PATENTS

| Number | Name | Date |
| --- | --- | --- |
| 1,602,851 | Holt | Oct. 12, 1926 |
| 2,373,414 | Plummer | Apr. 10, 1945 |

FOREIGN PATENTS

| Number | Country | Date |
| --- | --- | --- |
| 87,919 | Austria | Apr. 10, 1922 |